(12) United States Patent
Pattanayak

(10) Patent No.: US 10,664,846 B2
(45) Date of Patent: May 26, 2020

(54) METHOD AND SYSTEM FOR AUTHENTICATION OF CONSUMER GEOLOCATION USING TRANSACTION MESSAGES

(71) Applicant: MasterCard International Incorporated, Purchase, NY (US)

(72) Inventor: Purnima Pattanayak, Singapore (SG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 430 days.

(21) Appl. No.: 15/164,170

(22) Filed: May 25, 2016

(65) Prior Publication Data
US 2017/0344997 A1 Nov. 30, 2017

(51) Int. Cl.
*G06Q 20/40* (2012.01)
*G06Q 20/10* (2012.01)
*G06Q 20/32* (2012.01)
*G06Q 40/02* (2012.01)

(52) U.S. Cl.
CPC ....... *G06Q 20/409* (2013.01); *G06Q 20/1085* (2013.01); *G06Q 20/3224* (2013.01); *G06Q 40/02* (2013.01)

(58) Field of Classification Search
CPC ............. G06Q 20/409; G06Q 20/1085; G06Q 20/3244; G06Q 40/02
See application file for complete search history.

(56) References Cited

U.S. PATENT DOCUMENTS

| | | | | |
|---|---|---|---|---|
| 7,857,212 B1* | 12/2010 | Matthews | ............... | G06Q 10/02 235/380 |
| 2006/0038004 A1* | 2/2006 | Rielly | ................ | G06Q 20/1085 235/379 |
| 2010/0022254 A1* | 1/2010 | Ashfield | ............ | G06Q 20/3224 455/456.6 |
| 2011/0238517 A1* | 9/2011 | Ramalingam | .......... | G06Q 20/40 342/357.51 |
| 2014/0012688 A1* | 1/2014 | McGuinness | .......... | G06Q 20/40 705/16 |

(Continued)

OTHER PUBLICATIONS

Munson, Lee ("MasterCard aims to reduce card fraud with smartphone geo-location technology", Feb. 26, 2014. (Year: 2014).*

*Primary Examiner* — Eric T Wong
(74) *Attorney, Agent, or Firm* — Buchanan Ingersoll & Rooney PC

(57) ABSTRACT

A method for authenticating a transaction account, comprising: providing access to a transaction account after validating an account identifier associated with a payment card and authentication information of the transaction account; receiving an input instruction configured to request authentication of use of the payment card in a geographic region associated with the ATM; electronically transmitting, a plurality of data elements comprising the account identifier, the geographic region associated with the ATM, and a processing code indicative of the requested authentication of use of the payment card; receiving authentication permitting the payment card for use in the geographic region associated with the ATM; and displaying, data indicating the authentication permitting the payment card for use in the geographic region of the ATM.

20 Claims, 7 Drawing Sheets

(56) References Cited

U.S. PATENT DOCUMENTS

| | | | |
|---|---|---|---|
| 2015/0087303 A1* | 3/2015 | Hillary | H04W 4/021 455/435.1 |
| 2015/0106264 A1* | 4/2015 | Johnson | G07F 19/207 705/44 |
| 2015/0106268 A1* | 4/2015 | Carroll | G06Q 20/3224 705/44 |

* cited by examiner

METHOD AND SYSTEM FOR AUTHENTICATION OF CONSUMER GEOLOCATION USING TRANSACTION MESSAGES

FIELD

The present disclosure relates to the authentication of a consumer's geolocation using an automated teller machine (ATM), specifically in cross-border transactions such as, e.g., when the consumer has not previously set up a travel-alert.

BACKGROUND

As the use of payment cards and other payment instruments associated with transaction accounts increases, the amount of fraud that is attempted, often successfully, also increases. In addition, as new methods for automated and manual fraud detection and prevention are developed, fraudsters often try to develop new methods of their own, to continue perpetrating fraud. As a result, financial institutions, payment networks, merchants, and consumers are all often trying to continuously develop new automated and manual methods to prevent fraud on transaction accounts.

Fraud can be due to a payment card number being compromised, wherein the details of the card account become known to a fraudster who then uses it. When this use is in a geographic location where the cardholder is unlikely to be, a fraud alert can be used to prevent a transaction from being authorized. False denials of authorization requests can occur if a cardholder is traveling, particularly abroad to locations known for having statistically higher percentages of this type of compromised number fraud, when the same account number is used at foreign points of sale. Being aware of this, cardholders are asked to telephone the card account issuing bank to advise them of impending travel, which is not efficient, often ineffective and requires both increase human and computer processing time for the multiple format communications (e.g., voice, e-mail, etc.) that often have to be entered into another system including a payment system.

Cross-border transactions having a high fraud rate and hence most banks decline transactions if the card-holder does not set up a travel-alert. This has a heavy impact on consumers when traveling abroad. Many times the consumer's card will decline when traveling abroad due to not setting up a travel-alert. The consumer then has to deal with the cumbersome process of calling the issuer to pre-register for travel and/or finding other ways to pay, or avoiding the need to pay.

In effect, the issuer is also impacted because they lose transactions consumers would have otherwise made. In addition, the cost of call centers for travel support increases. The merchant and/or acquirer are also impacted by lost transactions and the cost of authorization for declined transactions increasing.

One effort to help aid consumers at hours when banks may not be open and in locations where banks were inconvenient or otherwise unavailable, such as in a cross-border transactions, were ATM machines. ATMs were created and spread throughout the world, enabling consumers to access account information, deposit checks or cash, withdrawal cash, and perform other aspects of account management. In many instances, ATMs read account details from a payment card, such as via a swipe of the payment card or insertion of the payment card into the ATM, and then enable the consumer to perform a variety of functions for the corresponding payment account.

However, many ATMs are associated with or in communication with a financial institution, such as one associated with a payment card provided by a consumer. However, in many instances ATMs are configured to perform only account management functions for account(s) directly corresponding to read payment card or cards, even in situations where the consumer may have additional payment accounts, beyond checking and savings, with the same financial institution.

Thus, there is a need for a technical solution that can utilize the hardware and functions of existing ATMs for use as a terminal for authentication of consumer geolocation using transaction messages.

SUMMARY

The present disclosure provides a description of systems and methods for the authentication of consumer geolocation using transaction messages.

A method for authenticating a transaction account, comprising: providing, by an automated teller machine (ATM), access to a transaction account after validating an account identifier associated with a payment card and authentication information of the transaction account; receiving, by an input device of the ATM, an input instruction configured to request authentication of use of the payment card in a geographic region associated with the ATM; electronically transmitting, by a transmitting device of the ATM, a transaction message formatted based on one or more standards to a financial institution associated with the transaction account, the transaction message including at least a plurality of data elements comprising at least a first data element configured to store the account identifier, a second data element configured to store the geographic region associated with the ATM, and a third data element configured to store a processing code indicative of the requested authentication of use of the payment card; receiving, by a receiving device of the ATM, a received transaction message formatted based on the one or more standards from the financial institution, the received transaction message including at least a plurality of data elements comprising at least a data element configured to store data indicative of authentication permitting the payment card for use in the geographic region associated with the ATM; and displaying, by a display device of the ATM, data indicating the authentication permitting the payment card for use in the geographic region of the ATM.

A method for authenticating a transaction account, comprising: transmitting, by a transmitting device of a processing server, a first transaction message formatted based on one or more standards to an automated teller machine (ATM), the first transaction message including a plurality of data elements including at least a first authentication data element configured to indicate validation of a transaction account after verifying an account identifier associated with a payment card and authentication information of the transaction account; receiving, by a receiving device of the processing server, a second transaction message formatted based on the one or more standards to the ATM, the second transaction message including at least a plurality of data elements comprising a first data element configured to store the account identifier, a second data element configured to store a geographic region associated with the ATM, and a third data element configured to store a processing code indicative of a requested authentication of the use of the payment card in the geographic region; and transmitting, by the transmitting device of the processing server, a third transaction message formatted based on one or more standards to the ATM, the third transaction message including at least a plurality of data elements comprising at least a data element configured to store data indicative of authentication permitting the payment card for use in the geographic region associated with the ATM.

A system for authenticating a transaction account, comprising: an account database of a processing server configured to store a plurality of account profiles, wherein each account profile includes a standardized data set of data related to a transaction account including at least an account identifier, authentication information, and one or more transaction account numbers; an automated teller machine (ATM) configured to: provide access to a transaction account after validating an account identifier associated with a payment card and authentication information of the transaction account; receive an input instruction configured to request authentication of use of the payment card in a geographic region associated with the ATM; electronically transmit a transaction message formatted based on one or more standards to a financial institution associated with the transaction account, the transaction message including at least a plurality of data elements comprising at least a first data element configured to store the account identifier, a second data element configured to store the geographic region associated with the ATM, and a third data element configured to store a processing code indicative of the requested authentication of use of the payment card; receive a received transaction message formatted based on the one or more standards from the financial institution, the received transaction message including at least a plurality of data elements comprising at least a data element configured to store data indicative of authentication permitting the payment card for use in the geographic region associated with the ATM; and display data indicating the authentication permitting the payment card for use in the geographic region of the ATM.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
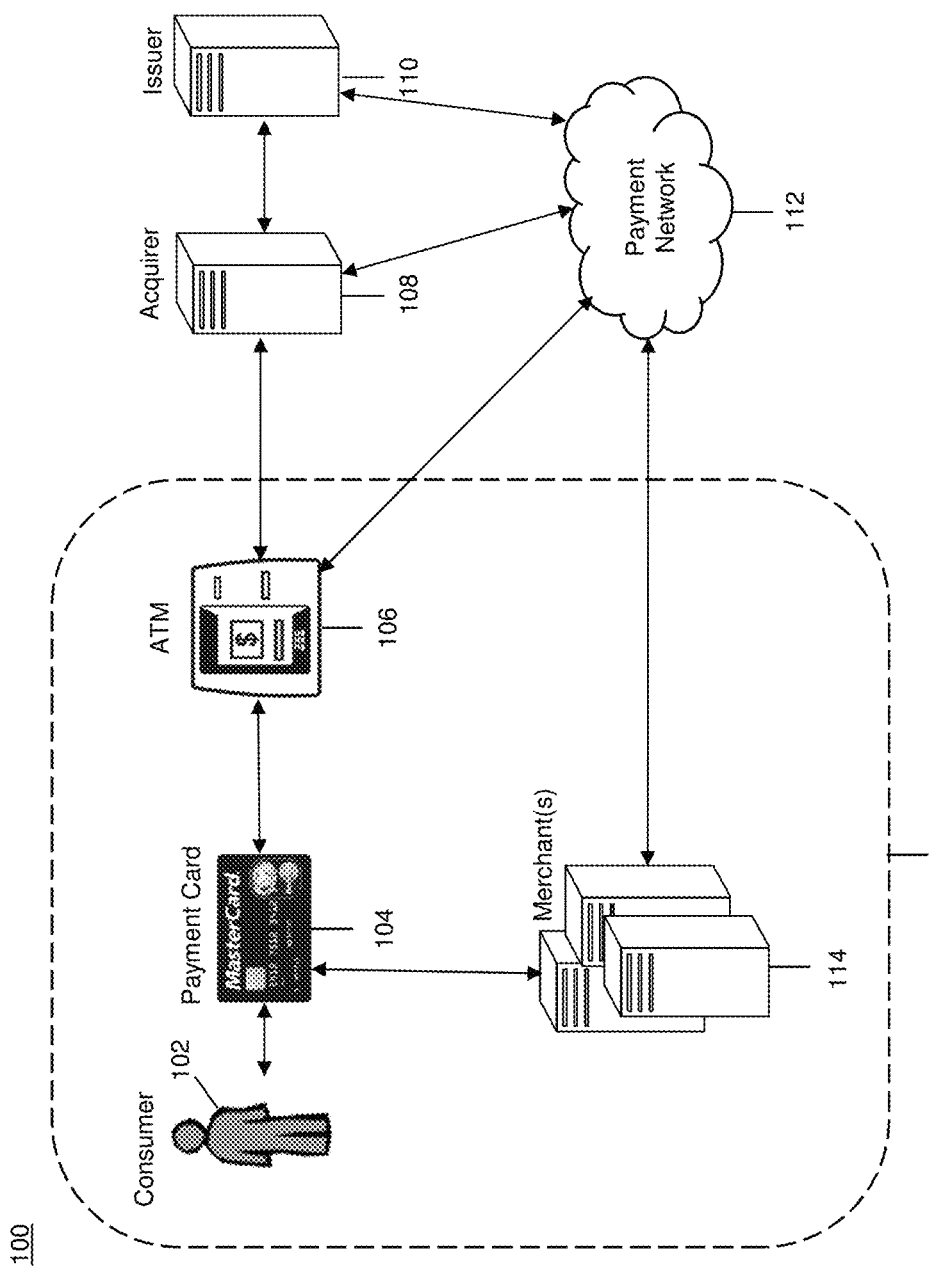
FIG. 1 is a high level architecture illustrating a system for the authentication of consumer geolocation using transaction messages in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have and require special knowledge in offered products. In some embodiments, an entity involved in a single transaction may be considered a merchant. In some instances, as used herein, the term "merchant" may refer to an apparatus or device of a merchant entity.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

System for the Authentication of Consumer Geolocation Using an Automated Teller Machine (ATM)

FIG. 1 illustrates a system 100 for a system for the authentication of a consumer geolocation using transaction messages in accordance with exemplary embodiments.

The system 100 may include a consumer 102. The consumer 102 may possess a payment card 104, which may be issued to the consumer 102 and corresponding to a payment account. The payment account corresponding to the consumer 102 may be held by or otherwise associated with an acquirer 108 (e.g., financial institution) and/or issuer 110 (e.g., issuing bank). The consumer 102 may use the payment card 104 at an ATM 106 to conduct payment transactions using the methods and systems discussed herein.

The ATM 106, discussed in more detail below, may be configured to authenticate the consumer's 102 geolocation within a geographic area 116. The ATM 106 may include an imaging unit or device, which may be configured to capture an image of the consumer 102 and associated objects. The ATM 106 may analyze the geolocation associated with the consumer 102 for authentication. For instance, the ATM 106 may identify the city and/or zip code of the consumer's location to authorize purchases. In another instance, the ATM 106 may identify biometric characteristics of the consumer 102 (e.g., fingerprint, palm veins, face recognition, DNA, palm print, hand geometry, iris recognition, retina and/or odor/scent, etc.) in order verify the consumer's 102 identity.

The ATM 106 may also be configured to enable the consumer 102 to select geographic regions for permitting use of the payment card 104. For example, the ATM 106 may include a geographic area 116 surrounding the ATM (e.g., the city, the zip code, etc.). The ATM 106 may permit the consumer 102 to select additional geographic regions (e.g., other cities, state, country, etc.) that the payment card 104 may be processed.

The ATM 106 may then contact the acquirer 108 and/or issuer 110 associated with the payment account corresponding to the payment card 104 and verify the account details. The ATM 106 may also receive information from the acquirer 108 regarding additional payment accounts associated with the consumer 102 that the consumer 102 may have access to via the use of the payment card 104. The ATM 106 may then present the additional payment accounts along with the payment account corresponding to the payment card 104 to the consumer 102 for selection to authenticate the additional payment accounts in the geographic area 116. The consumer 102 may select one of the available payment accounts for authentication using an input device of the ATM 106.

The system 100 may include a payment network 112. The payment network 112 may be configured to process payment transactions for transaction accounts using traditional methods and systems that will be apparent to persons having skill in the relevant art. The payment network 112 may include a processing server. The processing server may be configured to use profile rules set up via the ATM 106 to prevent fraudulent transactions for transaction accounts having multiple payment cards processed by the payment network 112.

The payment network 112, and, in some instances, the processing server of the payment network 112, may communicate with an issuer 110. The issuer 110 may be a financial institution configured to issue transaction accounts. In the system 100, the issuer 110 may issue a single transaction account to which a consumer 102 has access.

The issuer 110 may issue a payment card 104 associated with the payment account. The payment card 104 may be used by the consumer 102 to conduct payment transactions at a merchant 114. In a traditional payment transaction, the consumer 102 may present their payment card 104 to the merchant 114 for payment, the merchant 114 may read payment details from the payment card, and may transmit the payment details to the payment network 112 (e.g., via an acquiring financial institution, such as an acquiring bank) for processing.

In the system 100, the processing server may use profile rules that use the authenticated geographic area 116 in order to prevent fraudulent usage of payment card 104 or of the associated transaction account. As discussed in more detail below, the processing server may store an account profile related to the transaction account associated with the consumer 102. The account profile may include a plurality of profile rules. For one or more of the profile rules, each profile rule may be associated with a geographic area 116 during a set time period. For instance, the profile associated with the consumer 102 may include a first profile rule associated with a first geographic area 116 (e.g., visiting country).

When the consumer 102 uses their payment card 104 to conduct a payment transaction with the merchant 114 in the geographic area 116, transaction details for the payment transaction, including a geographic location of the merchant 114, may be transmitted to the processing server in the payment network 112 as part of the transaction. The processing server may identify the geographic location of the merchant 114 included in the transaction details as being located in the first geographic area 116, which is associated with a profile rule in the transaction account. Because the profile rule is associated with the geographic area 116 that includes the merchant 114, the transaction may be validated. In some embodiments, the transaction may be validated only with respect to the geolocation of the respective cardholder and the merchant 114, and additional validations (e.g., fraud controls, risk assessments, etc.) may be performed.

In an exemplary embodiment, there may be time controls associated with the geographic area 116. For example, if the consumer 102 is visiting a foreign country, the consumer 102 may present their payment card 104 at a local ATM 106 in the foreign county. The ATM 106 may present the consumer 102 with options of authenticating the payment card 104 within the geographic area 116. The options may comprise selecting at least one geographic area 116 (e.g., a city, a zip code, a country, etc.) for the payment card 104 to be authorized for use. The options may comprise selecting a time period of authentication (days, month, time, etc.). The consumer 102 may be presented these options at the ATM in order to authorize use of the payment card 104.

In an exemplary embodiment, a consumer 102 who lives in the United States (e.g., home country), may travel to Europe and may visit multiple countries in a span of a week. In the first country (e.g., France) the consumer 102 may present the payment card 104 to a local ATM 106. The ATM 106 may present the consumer 102 with a geographic area 116 option. For example, it may present different geographic areas 116 for the payment card 104 to be authorized. The consumer 102 may select a city (e.g., Paris) for the geographic area 116 to use the payment card 104. In some implementations, the consumer 102 may select multiple geographic areas 116 to use the payment card 104. By authenticating the payment card 104 for the geographic area 116, the consumer 102 may present the payment card 104 to any merchant 114 in the geographic area 116 for use to make purchases. The payment network 112 may recognize the authentication of the payment card 104 within the geographic area 116 and authorize purchases.

When the consumer 102 enters a second geographic area (not shown) such as a second country (e.g., England), the consumer 102, may present the payment card 104 to a second ATM (not shown), and repeat the process above. The processing server may validate the transaction if the transacting merchant is located in a geographic area 116 associated with the options selected by the consumer 102. In some implementations, by authenticating the card the in second country, authorization of the card in the first country is automatically revoked. Thus, for example, if the consumer 102 travels from Paris to London, when the consumer 102 authenticates their payment card 104 in London, it may no longer be authenticated for use in Paris.

For example, if the consumer 102 uses the payment card 104 at a merchant 114 included in the geographic area 116, the processing server may validate the transaction. If a transaction is attempted using payment card 104 with a merchant (not shown) that is not located in the first geographic area 116, the processing server may determine that the transaction is invalid due to the merchant's location being outside of the geographic area 116 associated with the profile rules for the transaction account.

By using multiple profile rules for transaction accounts for which there are multiple payment cards issued, the processing server may be able to validate transactions for consumers 102 even if the payment cards 104 are used in two different geographic areas. This is an improvement over traditional systems, where if one cardholder travels outside of home location, such as when traveling to a foreign country, their payment card may no longer be used due to traditional fraud controls. If the cardholder contacts their financial institution (e.g., issuer 110) or payment network 112 to inform them of their traveling to the foreign country, transactions from that country may be allowed, but at the expense of transactions in the home country. Accordingly, the use of using an ATM to authenticate a payment card 104 for a geographic area 116 to transact successfully provides for an improved consumer 102 experience, which may provide for increased card usage, thereby increasing revenue and consumer relationships for acquirers 108, issuers 110, merchants 114, and payment networks 112.

In some embodiments, the processing server may be further configured to update profile rules associated with a transaction account. For example, if the consumer 102 travels outside of the second geographic area to a third geographic area, the processing server may be configured to update the profile rule that was associated with the second geographic area to be associated with the third geographic area. Therefore, when the consumer 102 attempts a transaction with a merchant in the third geographic area, the processing server may validate the transaction, but if a fraudster attempts a transaction in the second geographic area, the transaction may be determined to be invalid by the processing server.

By changing the geographic area associated with the profile rule, the processing server may be able to validate transactions for the consumers 102 regardless of where each individual cardholder may be located, while still protecting the transaction account from fraudulent transactions conducted outside of the appropriate geographic areas. In some implementations, the consumer 102 may preset geographic area 116 rules in the ATM 106 based on time. For example, the consumer 102 may set up an authorized use of the payment card 104 in Paris for five days, and then authorized use of the payment card in London for three days after the consumer 102 leaves Paris. As a result, the consumer 102 may be able to freely move and transact without performing any additional actions to enable use of their payment card 104 in the new areas.

In such embodiments, the processing server and/or payment network 112 may identify when the consumer 102 associated with a transaction account travel to a new geographic area outside of the geographic area 116 associated with the profile rules.

By updating the transaction account's profile rules upon entry of a consumer 102 in a new geographic area, the processing server may be able to provide greater protection against fraud without the negative effects of traditional methods. For instance, the consumer may transact freely in the new geographic area. Accordingly, the methods and systems discussed herein may provide for more effective protection against fraud that is less restrictive to consumers, more flexible for both consumers and issuers, and can operate faster and with greater efficiency than traditional systems, and with greater consumer privacy, due to a reduced frequency of checks on consumer locations.

Automated Teller Machine

Figure 2:
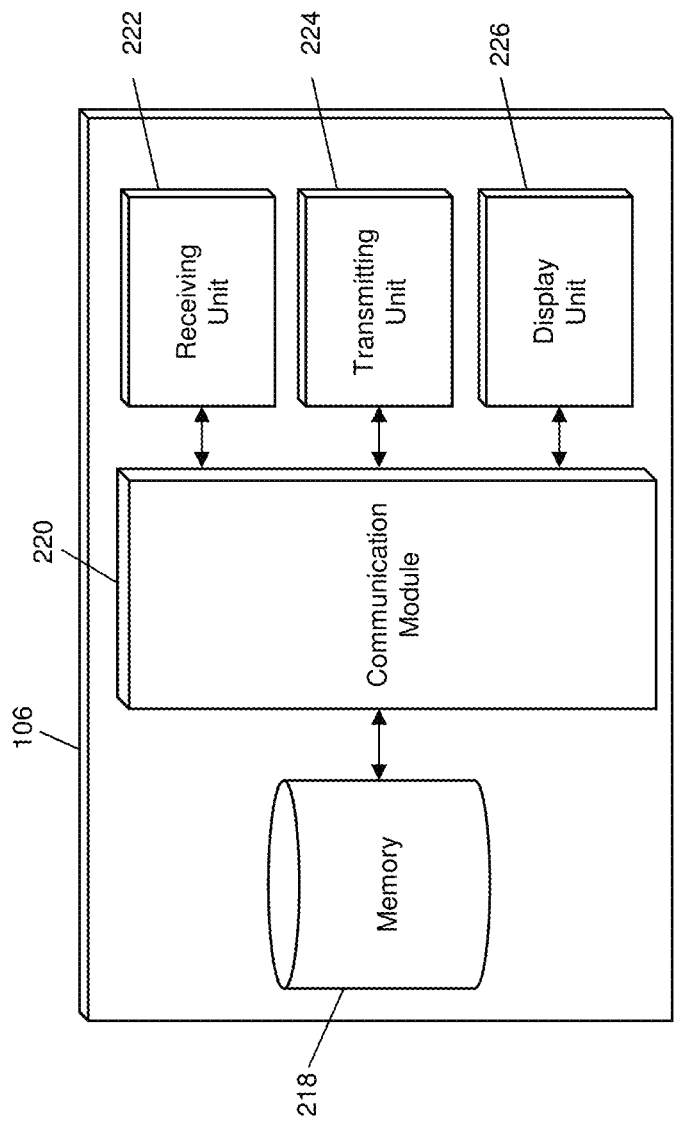
FIG. 2 is a block diagram illustrating the automated teller machine of FIG. 1 for presentation and processing of payment transactions in accordance with exemplary embodiments.

FIG. 2 is a block diagram illustrating the automated teller machine of FIG. 1 for presentation and processing of payment transactions in accordance with exemplary embodiments. It will be apparent to persons having skill in the relevant art that the embodiment of the ATM 106 illustrated in FIG. 2 is provided as illustration only and may not be exhaustive to all possible configurations of the ATM 106 suitable for performing the functions as discussed herein.

The ATM 106 may include a receiving unit 222. The receiving unit 222 may be configured to read the payment card 104 and payment details encoded thereof using traditional methods that will be apparent to persons having skill in the relevant art. The receiving unit 222, may also be configured to receive payment details for the payment card 104 using other methods, such as via near field communication from the payment card 104 or a mobile communication device configured to transmit payment details.

The ATM 106 may also include a transmitting unit 224. The transmitting unit 224 may be configured to transmit data over one or more networks via one or more network providers. The transmitting unit 224 may transmit the read and/or received payment details to the financial institution associated with the payment card 104 for verification. The receiving unit 222 may be configured to receive data over one or more networks via one or more network protocols, and may be configured to receive a response from the financial institution. The response may include account details for the payment account associated with the payment card 104 as well as account details associated with other payment accounts associated with the consumer 102 that may be used to fund a payment transaction. In some embodiments, the response may also include account details for a proposed new payment account or payment instrument.

The ATM 106 may include a display unit 226, which may be configured to display a list of payment accounts to be selected by the consumer 102 that includes the payment account associated with the payment card 104, other available payment accounts, and/or any potential new payment accounts or payment instruments available to the consumer 102. The display unit 226 may be any type of display suitable for performing the functions disclosed herein, such as a liquid crystal display, light emitting diode display, capacitive touch display, thin film transistor display, etc.

The ATM 106 may also include an input unit (not shown). The input unit may be configured to receive input from the consumer 102, such as for the selection of a payment account from the displayed list of payment accounts. The input unit may be any type of unit or device suitable for receiving input from a user, such as a keyboard, mouse, click wheel, scroll wheel, touch screen, microphone, camera, etc. In some embodiments, the display unit and input unit may be the same unit or device. In some instances, the ATM 106 may include multiple input units.

The ATM 106 may further include an imaging unit (not shown). The imaging unit may be configured to capture an image of an area near the ATM 106, such as an area including the consumer 102. The imaging unit may be a camera or other unit or device suitable for the capturing of images.

The ATM 106 may also include a communication module 220. The communication module 220 may be configured to perform the functions disclosed herein, including analyzing a captured image to identify one or more consumer characteristics. The one or more consumer characteristics may include biometric characteristics of the consumer 102 and/or other user, physical traits of the consumer 102 and/or other user, and additional characteristics that will be apparent to persons having skill in the relevant art.

The ATM 106 may also include a memory 218. The memory 218 may be configured to store data suitable for performing the functions disclosed herein, such as account information received from the financial institution, transaction data for a payment transaction based on selections from the consumer 102, consumer data associated with consumers for the filtering of products, etc. In some embodiments, the ATM 106 may include an account database configured to store account profiles (not shown). Each account profile may include data related to a payment account for selection by the consumer 102, such as an account identifier associated with the related payment account. In some instances, each account profile may be associated with a consumer 102 and may include the plurality of account number suitable for selection by the consumer 102.

In one embodiment, the ATM 106 may also include a printing unit (not shown). The printing unit may be any type of unit or device suitable for the printing of receipts, vouchers, and/or payment instruments. The printing unit may be configured to print receipts for approved and process payment transactions, print payment instruments corresponding to a newly issued payment account or instrument, etc. In some instances, the ATM 106 may be configured to print a payment card encoded with payment details corresponding to a newly opened payment account.

It will be apparent to persons having skill in the relevant art that the ATM 106 may include additional components suitable for performing the traditional functions of an automated teller machine, and/or that the components of the ATM 106 illustrated in FIG. 2 and discussed above may be further configured to perform the traditional functions of an automated teller machine. For example, the ATM 106 may include a dispensing unit configured to dispense currency (not shown), the input unit and/or receiving unit 222 may be configured to accept checks or deposit slips, etc.

Process for Authentication of Consumer Geolocation

Figure 3:
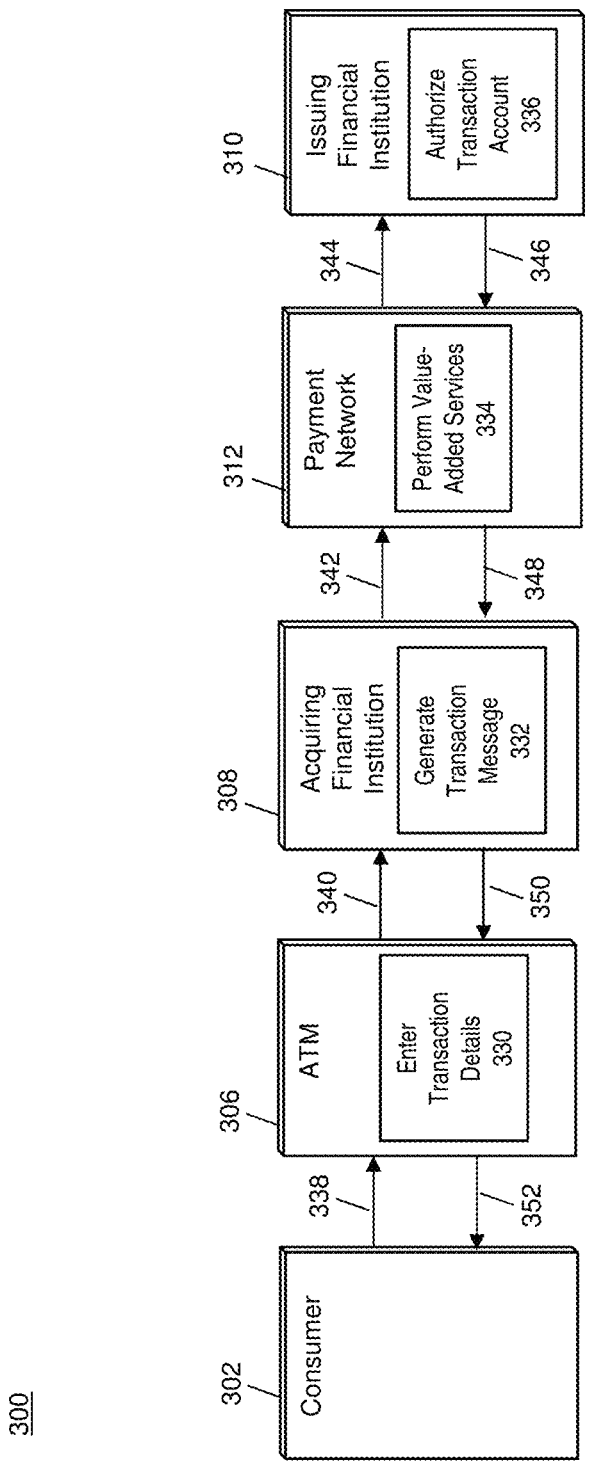
FIG. 3 is a flow diagram illustrating a process the authentication of consumer geolocation using transaction messages via the automated teller machine of FIG. 2 in accordance with exemplary embodiments.

FIG. 3 is a flow diagram illustrating a process the authentication of consumer geolocation using transaction messages via the automated teller machine of FIG. 2 in accordance with exemplary embodiments.

At step 338, the consumer 302 may present the payment card 104 to the ATM 306 and choose, for example, an "I'm here" option which the ATM 306 processes. In some implementations, additional options, such as geographic area and/or time period for authorization may be displayed to the consumer. In some implementations, the ATM 306 may automatically decide the geographic area for the payment card to be authorized for use. For example, the ATM may decide the geographic area may be the country, city, zip code and/or any other geographic boundaries in which the ATM 306 is located.

At step 340, the ATM 306 transmits an authentication request to the acquiring financial institution 308 (e.g., acquirer 108). At step 342, the acquiring financial institution 308 transmits the authentication request to the payment network 312 (e.g., the payment network operated by MasterCard International Incorporated, the assignee of the present disclosure).

At step 344, the payment network 312 may identify an account profile of the payment card 104 and transmit the authentication request to the issuing financial institution 310 (e.g., issuer 110). The payment network 312 may identify an account profile associated with the payment card 104 based on the encoded payment details. In some embodiments, identification of the account profile may include identifying an account profile stored in the memory and/or an account database that includes an account identifier corresponding to an account identifier encoded in the payment card 104 and read by the receiving unit 222. In other embodiments, identification of the account profile may include transmitting the account identifier read from the payment card 104 to the financial institution 310 by the transmitting unit 224 of the ATM 106 and receipt of the account profile by the receiving unit 222 of the ATM 106 as a response from the financial institution 310. In some implementations, the payment network 312 may attach a fraud score along with the request for authorization message to the issuer, for additional security, and/or for an additional charge.

At step 346, the issuing financial institution 310 may authorize the payment card for use, and transmit the authorization to the payment network 312. The authorization may include the geographic area where the payment card may be used. At step 348, the payment network 312 may transmit the authorization message to the acquiring financial institution 308. At step 350, the acquiring financial institution 308 may transmit the authorization message to the ATM 306.

At step 352, the ATM 306 may display a message to the consumer 302 that the payment card is ready for use. In some implementations, once the account profile has been identified, the display unit 226 of the ATM 106 may display a list of payment accounts for selection by the consumer 102. The list of payment accounts may include the payment account corresponding to the inserted payment card 104 and any other payment accounts included in the identified account profile. In some embodiments, the list of payment accounts may include an option to open a new payment account or be issued a new payment instrument to be used to fund the payment transaction. The input unit of the ATM 106 may receive a selection from the consumer 102, selecting one of the options (e.g., geographic area authentication and/or time period authentication) display to the consumer 102. The authorization request may include the stored transaction data and payment details corresponding to the selected (e.g., previously existing and/or newly generated) payment account.

Figure 4:
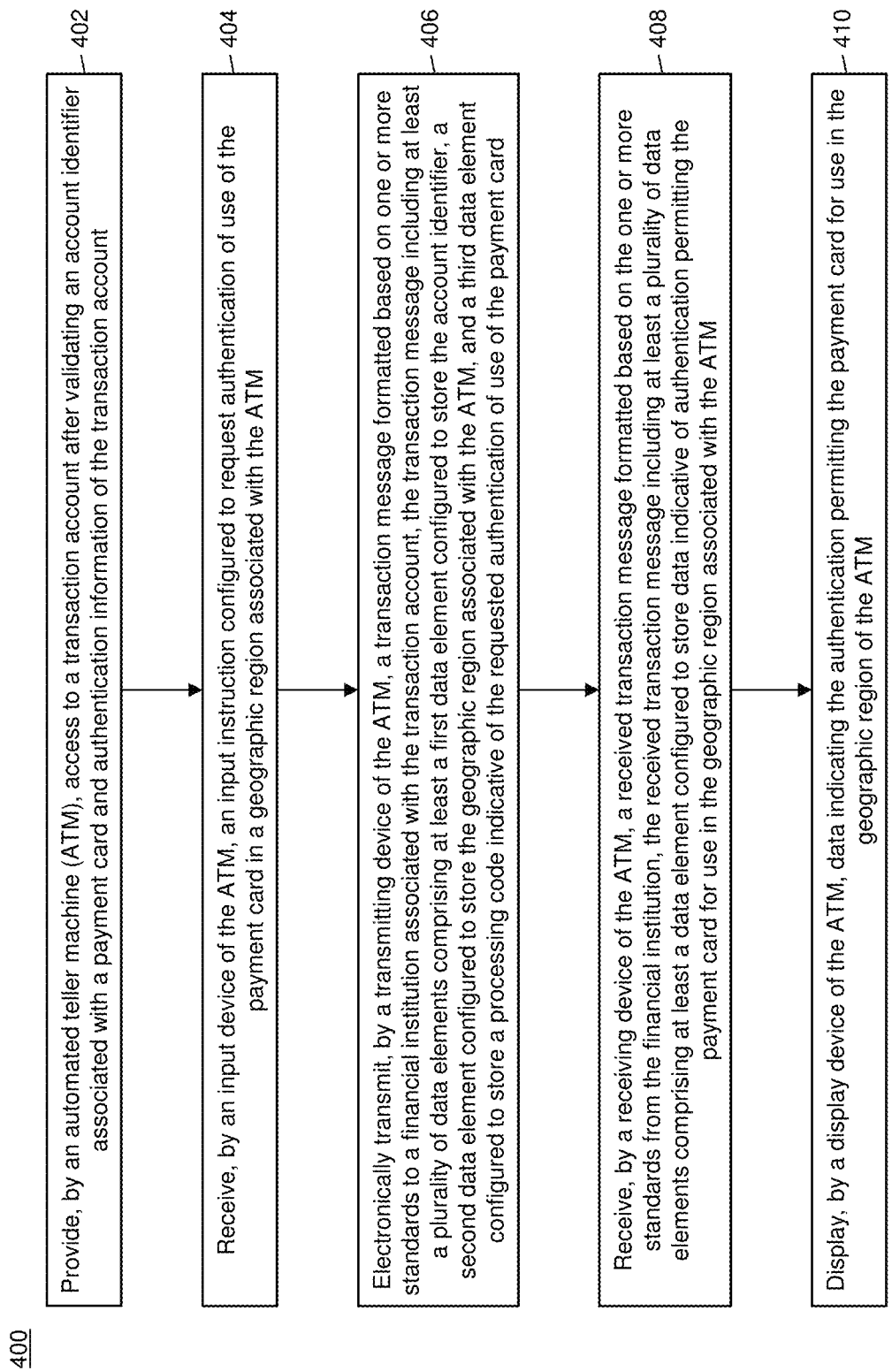
FIG. 4 is a flow diagram illustrating a process for the authentication of consumer geolocation using transaction messages via the automated teller machine of FIG. 2 in accordance with exemplary embodiments.

Process for the Authentication of Consumer Geolocation using Transaction Messages FIG. 4 is a flow diagram illustrating a process 400 for the authentication of consumer geolocation using transaction messages via the automated teller machine of FIG. 2 in accordance with exemplary embodiments.

At step 402, access to a transaction account may be provided by an automated teller machine (e.g., the automated teller machine 106) after validating an account identifier associated with a payment card and authentication information of the transaction account. In some implementations the payment card associated with the transaction account comprises at least one of: a debit card, and a credit card. In some implementations, authentication information comprises at least one of: a biometric input, and a personal identification (PIN). In an exemplary embodiment, the biometric input may be one or more of: fingerprint, palm veins, face recognition, DNA, palm print, hand geometry, iris recognition, retina and/or odor/scent. In an exemplary embodiment, the PIN may be an alphanumeric code, a numeric code, and/or any other combination of numbers, letters and/or symbols.

At step 404, the input device of the ATM receives a non-financial transaction request in the form of an input instruction configured to request authentication of use of the payment card in a geographic region associated with the ATM. In some implementations, the geographic region comprises at least one of: a country, a city, a zip code, a market boundary and/or any other boundary.

At step 406, the transmitting device of the ATM electronically transmits an authentication request in the form of a transaction message formatted based on one or more standards to a financial institution associated with the transaction account. The transaction message may include at least a plurality of data elements comprising at least a first data element configured to store the account identifier, a second data element configured to store the geographic region associated with the ATM, and a third data element configured to store a processing code indicative of the requested authentication of use of the payment card. In some implementations, the one or more standards includes the ISO8583 standard.

At step 408, a receiving device of the ATM (e.g., receiving unit 222) receives a received transaction message formatted based on the one or more standards from the financial institution. The received transaction message includes at least a plurality of data elements comprising at least a data element configured to store data indicative of authentication permitting the payment card for use in the geographic region associated with the ATM. A display device of the ATM, may display data indicating the authentication permitting the payment card for use in the geographic region of the ATM.

At step 410, a display device of the ATM (e.g., display unit 226) displays data indicating the authentication permitting the payment card for use in the geographic region of the ATM.

In some implementations, the process described above may be repeated for a second ATM (e.g., in a second country). The second ATM may provide access to the transaction account after validating the account identifier associated with the payment card and authentication information of the transaction account. An input device of the second ATM may receive an input instruction configured to request authentication of use of the payment card in a second geographic region associated with the second ATM and un-authorization of the use of the payment card in the geographic region associated with the first ATM.

A transmitting device of the second ATM may electronically transmit a second transaction message formatted based on one or more standards to the financial institution, the second transaction message including at least a plurality of data elements comprising at least a first data element configured to store the account identifier, a second data element configured to store the second geographic region associated with the second ATM, and a third data element configured to store a processing code indicative of the requested authentication of use of the payment card.

A receiving device of the second ATM may receive a second received transaction message formatted based on the one or more standards from the financial institution, the second received transaction message including at least a plurality of data elements comprising at least a data element configured to store data indicative of authentication permitting the payment card for use in the second geographic region associated with the second ATM.

A display device the second ATM may display data indicating the authentication permitting the payment card for use in the second geographic region associated with the second ATM. The method of claim 1, wherein the authentication remains in effect for a consumer input date range specifying a length of time the payment card will be active in the geographic region associated with the ATM.

Figure 5:
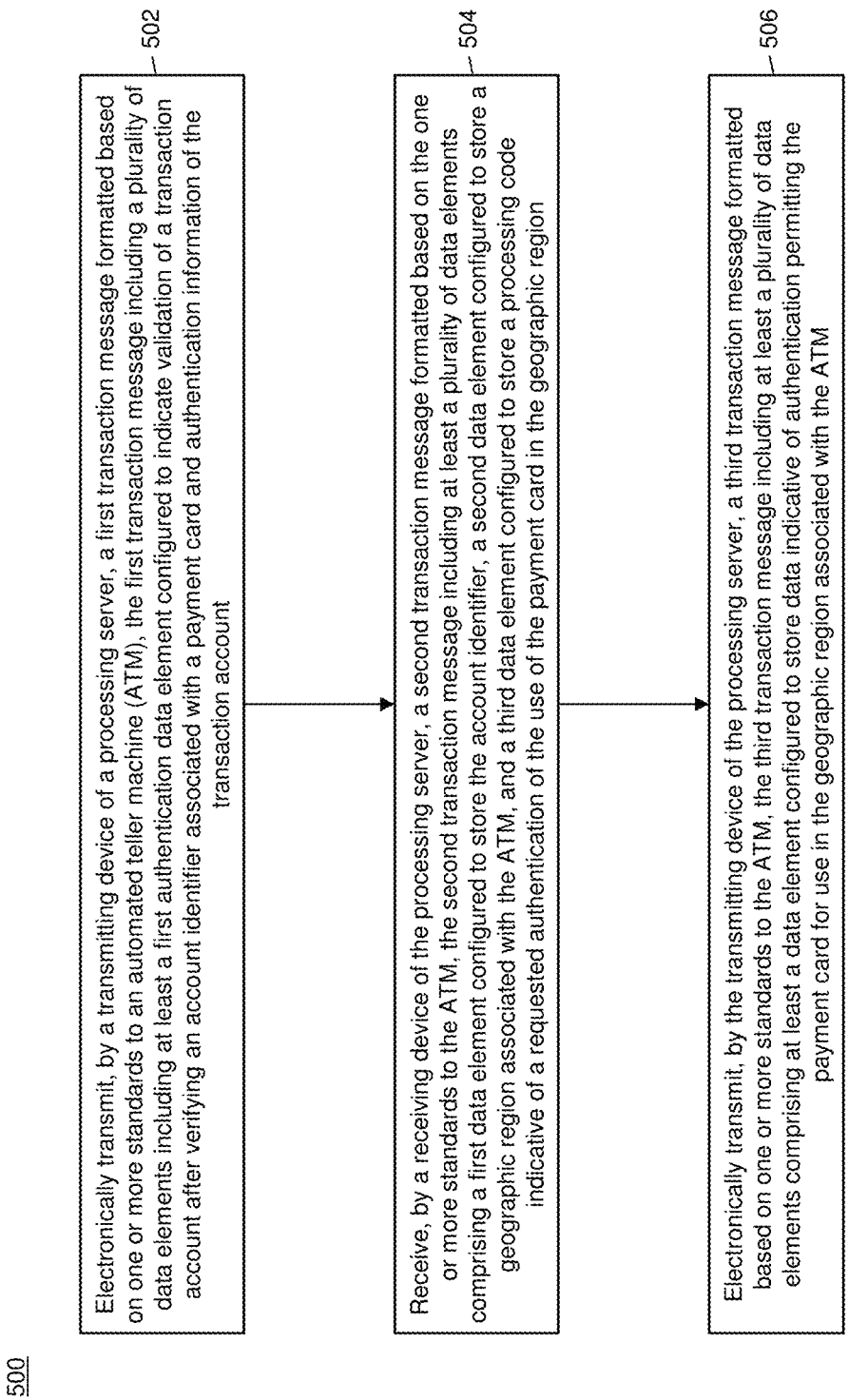
FIG. 5 is a flow diagram illustrating a process for the authentication of consumer geolocation using transaction messages via the automated teller machine of FIG. 2 in accordance with exemplary embodiments.

FIG. 5 is a flow diagram illustrating a process 500 for the authentication of consumer geolocation using transaction messages via the automated teller machine of FIG. 2 in accordance with exemplary embodiments.

At step 502, a method for authenticating a transaction account may comprise transmitting, by a transmitting device of a processing server, a first transaction message formatted based on one or more standards to an automated teller machine (ATM), the first transaction message including a plurality of data elements including at least a first authentication data element configured to indicate validation of a transaction account after verifying an account identifier associated with a payment card and authentication information of the transaction account.

At step 504, a receiving device of the processing server may receive a second transaction message formatted based on the one or more standards to the ATM, the second transaction message including at least a plurality of data elements comprising a first data element configured to store the account identifier, a second data element configured to store a geographic region associated with the ATM, and a third data element configured to store a processing code indicative of a requested authentication of the use of the payment card in the geographic region.

At step 506, the transmitting device of the processing server may transmit a third transaction message formatted based on one or more standards to the ATM, the third transaction message including at least a plurality of data elements comprising at least a data element configured to store data indicative of authentication permitting the payment card for use in the geographic region associated with the ATM. In some implementations, the one or more standards include the ISO8583 standard.

In some implementations, the transmitting device of the processing server may transmit a fourth transaction message formatted based on one or more standards to a second ATM, the fourth transaction message including a plurality of data elements including at least a first authentication data element configured to indicate validation of the transaction account after verifying the account identifier associated with the payment card and authentication information of the transaction account.

A receiving device of the processing server, may receive a fifth transaction message formatted based on the one or more standards to the second ATM, the fifth transaction message including at least a plurality of data elements comprising a first data element configured to store the account identifier, a second data element configured to store a second geographic region associated with the second ATM, and a third data element configured to store a processing code indicative of a requested authentication of the use of the payment card in the second geographic region.

The transmitting device of the processing server may transmit a sixth transaction message formatted based on one or more standards to the second ATM, the sixth transaction message including at least a plurality of data elements comprising at least a data element configured to store data indicative of authentication permitting the payment card for use in the second geographic region associated with the second ATM.

Payment Transaction Processing System and Process

Figure 6:
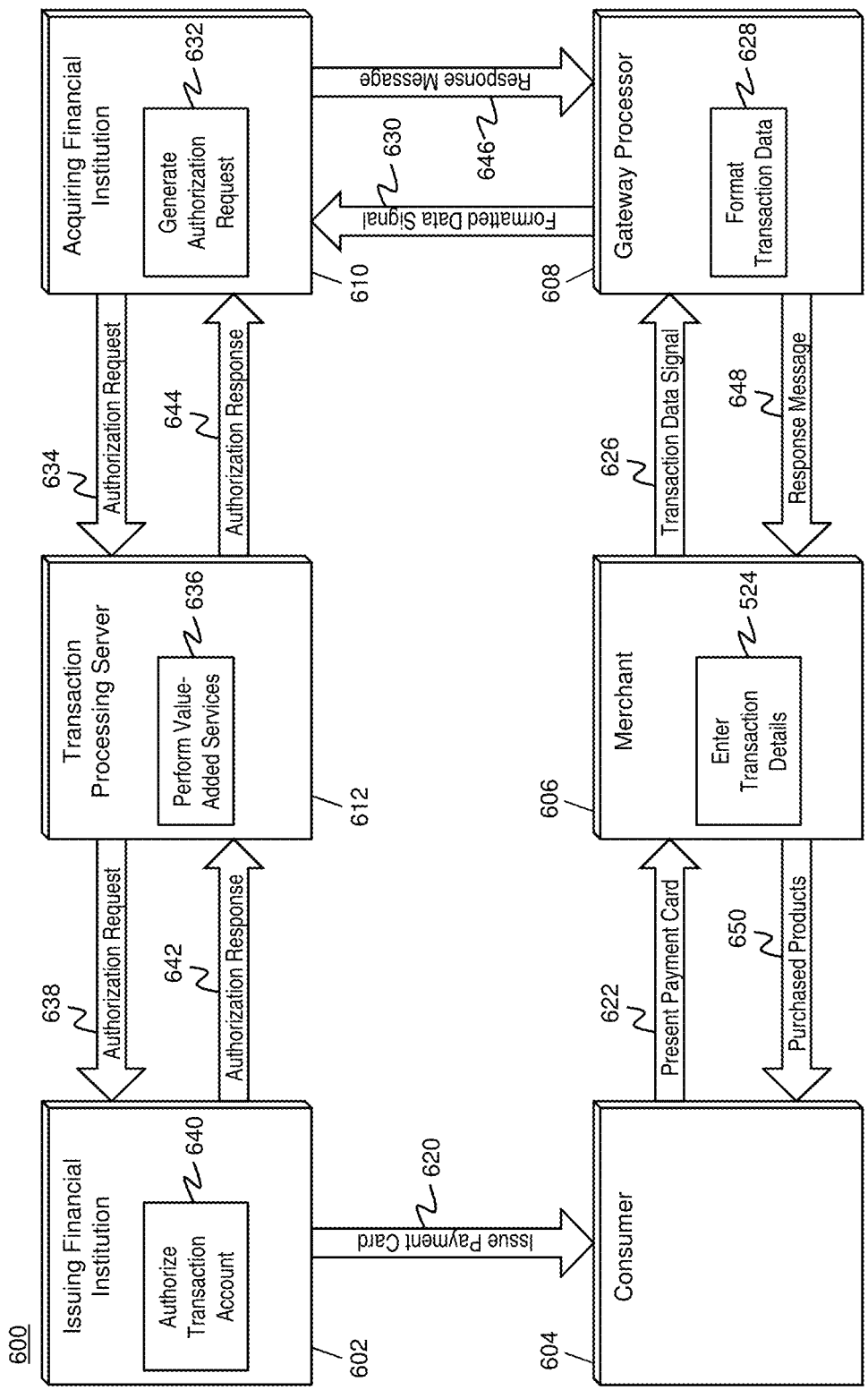
FIG. 6 is a flow diagram illustrating the processing of a payment transaction in accordance with exemplary embodiments.

FIG. 6 is a flow diagram 600 illustrating the processing of a payment transaction in accordance with exemplary embodiments.

The process 600 and steps included therein may be performed by one or more components of the system 100 discussed above, such as the acquirer 108, issuer 110, consumer 102, payment card 104, merchants 114, payment network 112, etc. The processing of payment transactions using the system and process 600 illustrated in FIG. 6 and discussed below may utilize the payment rails, which may be comprised of the computing devices and infrastructure utilized to perform the steps of the process 600 as specially configured and programmed by the entities discussed below, including the transaction processing server 612, which may be associated with one or more payment networks configured to processing payment transactions. It will be apparent to persons having skill in the relevant art that the process 600 may be incorporated into the processes illustrated in FIGS. 3, 4, and 5, discussed above, with respect to the step or steps involved in the processing of a payment transaction. In addition, the entities discussed herein for performing the process 600 may include one or more computing devices or systems configured to perform the functions discussed below. For instance, the merchant 606 may be comprised of one or more point of sale devices, a local communication network, a computing server, and other devices configured to perform the functions discussed below.

In step 620, an issuing financial institution 602 may issue a payment card or other suitable payment instrument to a consumer 604. The issuing financial institution may be a financial institution, such as a bank, or other suitable type of entity that administers and manages payment accounts and/or payment instruments for use with payment accounts that can be used to fund payment transactions. The consumer 604 may have a transaction account with the issuing financial institution 602 for which the issued payment card is associated, such that, when used in a payment transaction, the payment transaction is funded by the associated transaction account. In some embodiments, the payment card may be issued to the consumer 604 physically. In other embodiments, the payment card may be a virtual payment card or otherwise provisioned to the consumer 604 in an electronic format.

In step 622, the consumer 604 may present the issued payment card to a merchant 606 for use in funding a payment transaction. The merchant 606 may be a business, another consumer, or any entity that may engage in a payment transaction with the consumer 604. The payment card may be presented by the consumer 604 via providing the physical card to the merchant 606, electronically transmitting (e.g., via near field communication, wireless transmission, or other suitable electronic transmission type and protocol) payment details for the payment card, or initiating transmission of payment details to the merchant 606 via a third party. The merchant 606 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 624, the merchant 606 may enter transaction details into a point of sale computing system. The transaction details may include the payment details provided by the consumer 604 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 606 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 606 may be an online retailer in an e-commerce transaction. In such embodiments, the transaction details may be entered in a shopping cart or other repository for storing transaction data in an electronic transaction as will be apparent to persons having skill in the relevant art.

In step 626, the merchant 606 may electronically transmit a data signal superimposed with transaction data to a gateway processor 608. The gateway processor 608 may be an entity configured to receive transaction details from a merchant 606 for formatting and transmission to an acquiring financial institution 610. In some instances, a gateway processor 608 may be associated with a plurality of merchants 606 and a plurality of acquiring financial institutions 610. In such instances, the gateway processor 608 may receive transaction details for a plurality of different transactions involving various merchants, which may be forwarded on to appropriate acquiring financial institutions 610. By having relationships with multiple acquiring financial institutions 610 and having the requisite infrastructure to communicate with financial institutions using the payment rails, such as using application programming interfaces associated with the gateway processor 608 or financial institutions used for the submission, receipt, and retrieval of data, a gateway processor 608 may act as an intermediary for a merchant 606 to be able to conduct payment transactions via a single communication channel and format with the gateway processor 608, without having to maintain relationships with multiple acquiring financial institutions 610 and payment processors and the hardware associated thereto. Acquiring financial institutions 610 may be financial institutions, such as banks, or other entities that administers and manages payment accounts and/or payment instruments for use with payment accounts. In some instances, acquiring financial institutions 610 may manage transaction accounts for merchants 606. In some cases, a single financial institution may operate as both an issuing financial institution 602 and an acquiring financial institution 610.

The data signal transmitted from the merchant 606 to the gateway processor 608 may be superimposed with the transaction details for the payment transaction, which may be formatted based on one or more standards. In some embodiments, the standards may be set forth by the gateway processor 608, which may use a unique, proprietary format for the transmission of transaction data to/from the gateway processor 608. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 608.

In step 628, the gateway processor 608 may parse the transaction data signal to obtain the transaction data superimposed thereon and may format the transaction data as necessary. The formatting of the transaction data may be performed by the gateway processor 608 based on the proprietary standards of the gateway processor 608 or an acquiring financial institution 610 associated with the payment transaction. The proprietary standards may specify the type of data included in the transaction data and the format for storage and transmission of the data. The acquiring financial institution 610 may be identified by the gateway processor 608 using the transaction data, such as by parsing the transaction data (e.g., deconstructing into data elements) to obtain an account identifier included therein associated with the acquiring financial institution 610. In some instances, the gateway processor 608 may then format the transaction data based on the identified acquiring financial institution 610, such as to comply with standards of formatting specified by the acquiring financial institution 610. In some embodiments, the identified acquiring financial institution 610 may be associated with the merchant 606 involved in the payment transaction, and, in some cases, may manage a transaction account associated with the merchant 606.

In step 630, the gateway processor 608 may electronically transmit a data signal superimposed with the formatted transaction data to the identified acquiring financial institution 610. The acquiring financial institution 610 may receive the data signal and parse the signal to obtain the formatted transaction data superimposed thereon. In step 632, the acquiring financial institution 610 may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 606 involved in the payment transaction is requesting payment or a promise of payment from the issuing financial institution 602 for the transaction. The authorization request may include a plurality of data elements, each data element being configured to store data as set forth in the associated standards, such as for storing an account number, application cryptogram, transaction amount, issuing financial institution 602 information, etc.

In step 634, the acquiring financial institution 610 may electronically transmit the authorization request to a transaction processing server 612 for processing. The transaction processing server 612 may be comprised of one or more computing devices as part of a payment network configured to process payment transactions. In some embodiments, the authorization request may be transmitted by a transaction processor at the acquiring financial institution 610 or other entity associated with the acquiring financial institution. The transaction processor may be one or more computing devices that include a plurality of communication channels for communication with the transaction processing server 612 for the transmission of transaction messages and other data to and from the transaction processing server 612. In some embodiments, the payment network associated with the transaction processing server 612 may own or operate each transaction processor such that the payment network may maintain control over the communication of transaction messages to and from the transaction processing server 612 for network and informational security.

In step 636, the transaction processing server 612 may perform value-added services for the payment transaction. Value-added services may be services specified by the issuing financial institution 602 that may provide additional value to the issuing financial institution 602 or the consumer 604 in the processing of payment transactions. Value-added services may include, for example, fraud scoring, transaction or account controls, account number mapping, offer redemption, loyalty processing, etc. For instance, when the transaction processing server 612 receives the transaction, a fraud score for the transaction may be calculated based on the data included therein and one or more fraud scoring algorithms and/or engines. In some instances, the transaction processing server 612 may first identify the issuing financial institution 602 associated with the transaction, and then identify any services indicated by the issuing financial institution 602 to be performed. The issuing financial institution 602 may be identified, for example, by data included in a specific data element included in the authorization request, such as an issuer identification number. In another example, the issuing financial institution 602 may be identified by the primary account number stored in the authorization request, such as by using a portion of the primary account number (e.g., a bank identification number) for identification.

In step 638, the transaction processing server 612 may electronically transmit the authorization request to the issuing financial institution 602. In some instances, the authorization request may be modified, or additional data included in or transmitted accompanying the authorization request as a result of the performance of value-added services by the transaction processing server 612. In some embodiments, the authorization request may be transmitted to a transaction processor (e.g., owned or operated by the transaction processing server 612) situated at the issuing financial institution 602 or an entity associated thereof, which may forward the authorization request to the issuing financial institution 602.

In step 640, the issuing financial institution 602 may authorize the transaction account for payment of the payment transaction. The authorization may be based on an available credit amount for the transaction account and the transaction amount for the payment transaction, fraud scores provided by the transaction processing server 612, and other considerations that will be apparent to persons having skill in the relevant art. The issuing financial institution 602 may modify the authorization request to include a response code indicating approval (e.g., or denial if the transaction is to be denied) of the payment transaction. The issuing financial institution 602 may also modify a message type indicator for the transaction message to indicate that the transaction message is changed to be an authorization response. In step 642, the issuing financial institution 602 may transmit (e.g., via a transaction processor) the authorization response to the transaction processing server 612.

In step 644, the transaction processing server 612 may forward the authorization response to the acquiring financial institution 610 (e.g., via a transaction processor). In step 646, the acquiring financial institution may generate a response message indicating approval or denial of the payment transaction as indicated in the response code of the authorization response, and may transmit the response message to the gateway processor 608 using the standards and protocols set forth by the gateway processor 608. In step 648, the gateway processor 608 may forward the response message to the merchant 606 using the appropriate standards and protocols. In step 650, assuming the transaction was approved, the merchant 606 may then provide the products purchased by the consumer 604 as part of the payment transaction to the consumer 604.

In some embodiments, once the process 600 has completed, payment from the issuing financial institution 602 to the acquiring financial institution 610 may be performed. In some instances, the payment may be made immediately or within one business day. In other instances, the payment may be made after a period of time, and in response to the submission of a clearing request from the acquiring financial institution 610 to the issuing financial institution 602 via the transaction processing server 602. In such instances, clearing requests for multiple payment transactions may be aggregated into a single clearing request, which may be used by the transaction processing server 612 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 640), the transaction processing server 612 may be configured to perform authorization of transactions on behalf of the issuing financial institution 602. Such actions may be referred to as "stand-in processing," where the transaction processing server "stands in" as the issuing financial institution 602. In such instances, the transaction processing server 612 may utilize rules set forth by the issuing financial institution 602 to determine approval or denial of the payment transaction, and may modify the transaction message accordingly prior to forwarding to the acquiring financial institution 610 in step 644. The transaction processing server 612 may retain data associated with transactions for which the transaction processing server 612 stands in, and may transmit the retained data to the issuing financial institution 602 once communication is reestablished. The issuing financial institution 602 may then process transaction accounts accordingly to accommodate for the time of lost communication.

In another example, if the transaction processing server 612 is unavailable for submission of the authorization request by the acquiring financial institution 610, then the transaction processor at the acquiring financial institution 610 may be configured to perform the processing of the transaction processing server 612 and the issuing financial institution 602. The transaction processor may include rules and data suitable for use in making a determination of approval or denial of the payment transaction based on the data included therein. For instance, the issuing financial institution 602 and/or transaction processing server 612 may set limits on transaction type, transaction amount, etc. that may be stored in the transaction processor and used to determine approval or denial of a payment transaction based thereon. In such instances, the acquiring financial institution 610 may receive an authorization response for the payment transaction even if the transaction processing server 612 is unavailable, ensuring that transactions are processed and no downtime is experienced even in instances where communication is unavailable. In such cases, the transaction processor may store transaction details for the payment transactions, which may be transmitted to the transaction processing server 612 (e.g., and from there to the associated issuing financial institutions 602) once communication is reestablished.

In some embodiments, transaction processors may be configured to include a plurality of different communication channels, which may utilize multiple communication cards and/or devices, to communicate with the transaction processing server 612 for the sending and receiving of transaction messages. For example, a transaction processor may be comprised of multiple computing devices, each having multiple communication ports that are connected to the transaction processing server 612. In such embodiments, the transaction processor may cycle through the communication channels when transmitting transaction messages to the transaction processing server 612, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 610 may identify that an authorization request involves an issuing financial institution 602 (e.g., via the bank identification number included in the transaction message) for which no value-added services are required. The transaction processor at the acquiring financial institution 610 may then transmit the authorization request directly to the transaction processor at the issuing financial institution 602 (e.g., without the authorization request passing through the transaction processing server 612), where the issuing financial institution 602 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 612 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 608, acquiring financial institution 610, etc.) for processing using this advanced network, and to quickly and efficiently receive a response regarding the ability for a consumer 604 to fund the payment transaction.

Computer System Architecture

Figure 7:
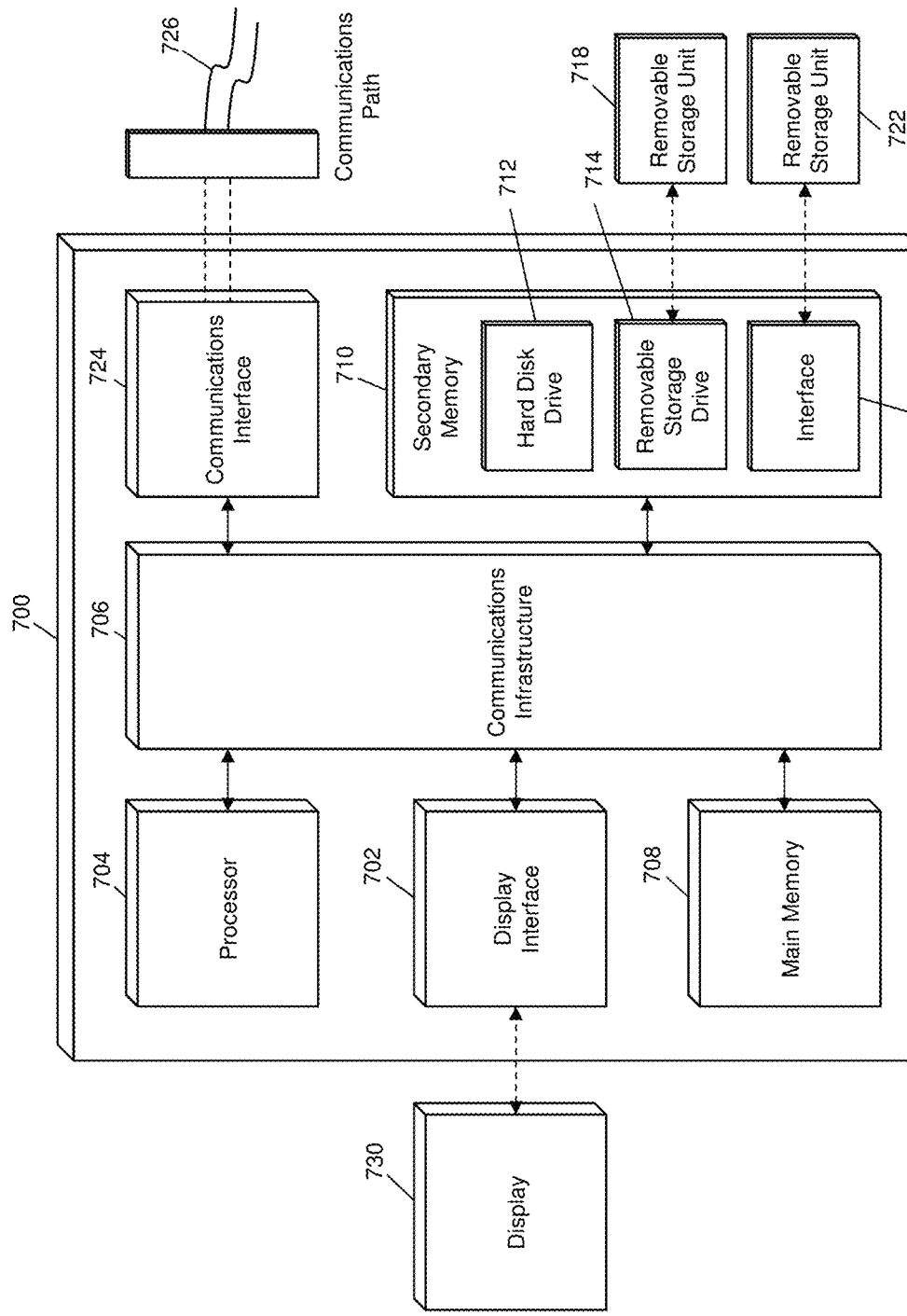
FIG. 7 is a block diagram illustrating a computer system architecture in accordance with exemplary embodiments.

FIG. 7 is a block diagram 700 illustrating a computer system architecture in accordance with exemplary embodiments. For example, the automated teller machine 106 of FIGS. 1 and 2, discussed above, may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for the authentication of consumer geolocation using transaction messages. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for authenticating a transaction account, comprising:
   providing, by an automated teller machine (ATM), access to a transaction account after validating an account identifier associated with a payment card and authentication information of the transaction account;
   receiving, by an input device of the ATM, an input instruction configured to:
   generate one or more profile rules for authenticating payment transactions associated with the transaction account and conducted over a payment network; and
   request authentication of use of the payment card in a geographic region associated with the ATM;
   electronically transmitting, by a transmitting device of the ATM over the payment network, a transaction message formatted based on one or more standards to a financial institution associated with the transaction account, the transaction message including at least a plurality of data elements comprising at least a first data element configured to store the account identifier, a second data element configured to store the geographic region associated with the ATM, and a third data element configured to store a processing code indicative of the requested authentication of use of the payment card, and other data elements associated with the one or more profile rules, respectively;
   receiving, by a receiving device of the ATM, a received transaction message formatted based on the one or more standards from the financial institution, the received transaction message including at least a plurality of data elements comprising at least a data element configured to store data indicative of authentication permitting the payment card for use in the geographic region associated with the ATM and according to the one or more profile rules; and displaying, by a display device of the ATM, data indicating the authentication permitting the payment card for use in the geographic region of the ATM;

wherein generation of the one or more profile rules by the ATM prohibits use of the payment card in a previously authenticated geographic region outside a currently authenticated geographic region associated with the ATM, when movement of consumer with the payment card into the currently authenticated geographic region is detected.

2. The method of claim 1, further comprising:

providing, by a second ATM, access to the transaction account after validating the account identifier associated with the payment card and authentication information of the transaction account;

receiving, by an input device of the second ATM, an input instruction configured to request authentication of use of the payment card in a second geographic region associated with the second ATM and un-authorization of the use of the payment card in the geographic region associated with the first ATM, the authentication request of the second ATM updating the one or more profile rules generated by the first ATM;

electronically transmitting, by a transmitting device of the second ATM over the payment network, a second transaction message formatted based on one or more standards to the financial institution, the second transaction message including at least a plurality of data elements comprising at least a first data element configured to store the account identifier, a second data element configured to store the second geographic region associated with the second ATM, and a third data element configured to store a processing code indicative of the requested authentication of use of the payment card;

receiving, by a receiving device of the second ATM over the payment network, a second received transaction message formatted based on the one or more standards from the financial institution, the second received transaction message including at least a plurality of data elements comprising at least a data element configured to store data indicative of authentication permitting the payment card for use in the second geographic region associated with the second ATM; and displaying, by a display device the second ATM, data indicating the authentication permitting the payment card for use in the second geographic region associated with the second ATM.

3. The method of claim 1, wherein authentication information comprises at least one of: a biometric input, and a personal identification (PIN).

4. The method of claim 1, wherein the authentication remains in effect for a consumer input date range specifying a length of time the payment card will be active in the geographic region associated with the ATM.

5. The method of claim 1, wherein the geographic region comprises at least one of: a country, a city, a zip code, and a market boundary.

6. The method of claim 1, wherein the payment card associated with the transaction account comprises at least one of: a debit card, and a credit card.

7. The method of claim 1, wherein the one or more standards includes the ISO8583 standard.

8. A method for authenticating a transaction account, comprising:

transmitting, by a transmitting device of a processing server, a first transaction message formatted based on one or more standards to an automated teller machine (ATM), the first transaction message including a plurality of data elements including at least a first authentication data element configured to indicate validation of a transaction account after verifying an account identifier associated with a payment card and authentication information of the transaction account;

receiving, by a receiving device of the processing server, a second transaction message formatted based on the one or more standards to the ATM, the second transaction message including at least a plurality of data elements comprising a first data element configured to store the account identifier, a second data element configured to store a geographic region associated with the ATM, a third data element configured to store a processing code indicative of a requested authentication of the use of the payment card in the geographic region, and other data elements associated with the one or more profile rules, respectively;

determining whether use of the payment card in the geographic region is authorized based on the one or more profile rules;

transmitting, by the transmitting device of the processing server, a third transaction message formatted based on one or more standards to the ATM, the third transaction message including at least a plurality of data elements comprising at least a data element configured to store data indicative of authentication permitting the payment card for use in the geographic region associated with the ATM; and updating the one or more profile rules to end authentication permitting the payment card for use in a previously authenticated geographic region outside a currently authenticated geographic region associated with the ATM when movement of consumer with the payment card into the currently authenticated geographic region is detected.

9. The method of claim 8, further comprising:

transmitting, by the transmitting device of the processing server, a fourth transaction message formatted based on one or more standards to a second ATM, the fourth transaction message including a plurality of data elements including at least a first authentication data element configured to indicate validation of the transaction account after verifying the account identifier associated with the payment card and authentication information of the transaction account;

receiving, by a receiving device of the processing server, a fifth transaction message formatted based on the one or more standards to the second ATM, the fifth transaction message including at least a plurality of data elements comprising a first data element configured to store the account identifier, a second data element configured to store a second geographic region associated with the second ATM, and a third data element configured to store a processing code indicative of a requested authentication of the use of the payment card in the second geographic region; and transmitting, by the transmitting device of the processing server, a sixth transaction message formatted based on one or more standards to the second ATM, the sixth transaction message including at least a plurality of data elements comprising at least a data element configured to store data indicative of authentication permitting the payment card for use in the second geographic region associated with the second ATM.

10. The method of claim 8, wherein the one or more standards includes the ISO8583 standard.

11. A system for authenticating a transaction account, comprising:
an account database of a processing server configured to store a plurality of account profiles, wherein each account profile includes a standardized data set of data related to a transaction account including at least an account identifier, authentication information, and one or more transaction account numbers;
an automated teller machine (ATM) configured to:
provide access to a transaction account after validating an account identifier associated with a payment card and authentication information of the transaction account;
receive an input instruction configured to:
generate one or more profile rules for monitoring payment transactions associated with the transaction account and conducted over a payment network; and
request authentication of use of the payment card in a geographic region associated with the ATM;
electronically transmit a transaction message over a payment network, the transaction message formatted based on one or more standards to a financial institution associated with the transaction account, the transaction message including at least a plurality of data elements comprising at least a first data element configured to store the account identifier, a second data element configured to store the geographic region associated with the ATM, and a third data element configured to store a processing code indicative of the requested authentication of use of the payment card, and other data elements associated with the one or more profile rules, respectively;
receive a received transaction message formatted based on the one or more standards from the financial institution over the payment network, the received transaction message including at least a plurality of data elements comprising at least a data element configured to store data indicative of authentication permitting the payment card for use in the geographic region associated with the ATM; and
display data indicating the authentication permitting the payment card for use in the geographic region of the ATM;
wherein the processing server updates the one or more profile rules to end authentication permitting the payment card for use in a previously authenticated geographic region outside a currently authenticated geographic region associated with the ATM when movement of consumer with the payment card into the currently authenticated geographic region is detected.

12. The system of claim 11, further comprising:
a second ATM configured to:
provide access to the transaction account after validating the account identifier associated with the payment card and authentication information of the transaction account;
receive an input instruction configured to request authentication of use of the payment card in a second geographic region associated with the second ATM and un-authorization of the use of the payment card in the geographic region associated with the first ATM, the authentication request of the second ATM updating the one or more profile rules generated by the first ATM;
electronically transmit a second transaction message formatted based on one or more standards to the financial institution over the payment network, the second transaction message including at least a plurality of data elements comprising at least a first data element configured to store the account identifier, a second data element configured to store the second geographic region associated with the second ATM, and a third data element configured to store a processing code indicative of the requested authentication of use of the payment card;
receive a second received transaction message formatted based on the one or more standards from the financial institution, the second received transaction message including at least a plurality of data elements comprising at least a data element configured to store data indicative of authentication permitting the payment card for use in the second geographic region associated with the second ATM; and
display data indicating the authentication permitting the payment card for use in the second geographic region associated with the second ATM.

13. The system of claim 11, wherein authentication information comprises at least one of: a biometric input, and a personal identification (PIN).

14. The system of claim 11, wherein the authentication remains in effect for a consumer input date range specifying a length of time the payment card will be active in the geographic region associated with the ATM.

15. The system of claim 11, wherein the geographic region comprises at least one of: a country, a city, a zip code, and a market boundary.

16. The system of claim 11, wherein the payment card associated with the transaction account comprises at least one of: a debit card, and a credit card.

17. The system of claim 11, wherein the one or more standards includes the ISO8583 standard.

18. A system for authenticating a transaction account, comprising:
an account database of a processing server configured to store a plurality of account profiles, wherein each account profile includes a standardized data set of data related to a transaction account including at least an account identifier, authentication information, and one or more transaction account numbers;
the processing server having at least one hardware component configured to:
transmit a first transaction message formatted based on one or more standards to an automated teller machine (ATM), the first transaction message including a plurality of data elements including at least a first authentication data element configured to indicate validation of a transaction account after verifying an account identifier associated with a payment card and authentication information of the transaction account;
receive a second transaction message formatted based on the one or more standards to the ATM, the second transaction message including at least a plurality of data elements comprising a first data element configured to store the account identifier, a second data element configured to store a geographic region associated with the ATM, a third data element configured to store a processing code indicative of a requested authentication of the use of the payment card in the geographic region, and other data elements associated with the one or more profile rules, respectively;

determine whether use of the payment card in the geographic region is authorized based on the one or more profile rules;

transmit a third transaction message formatted based on one or more standards to the ATM, the third transaction message including at least a plurality of data elements comprising at least a data element configured to store data indicative of authentication permitting the payment card for use in the geographic region associated with the ATM; and update the one or more profile rules to end authentication permitting the payment card for use in other a previously authenticated geographic region outside a currently authenticated geographic region associated with the ATM when movement of consumer with the payment card into the currently authenticated geographic region is detected.

19. The system of claim 18, further comprising:

the processing server further configured to:

transmit a fourth transaction message formatted based on one or more standards to a second ATM, the fourth transaction message including a plurality of data elements including at least a first authentication data element configured to indicate validation of the transaction account after verifying the account identifier associated with the payment card and authentication information of the transaction account;

receive a fifth transaction message formatted based on the one or more standards to the second ATM, the fifth transaction message including at least a plurality of data elements comprising a first data element configured to store the account identifier, a second data element configured to store a second geographic region associated with the second ATM, and a third data element configured to store a processing code indicative of a requested authentication of the use of the payment card in the second geographic region; and transmit a sixth transaction message formatted based on one or more standards to the second ATM, the sixth transaction message including at least a plurality of data elements comprising at least a data element configured to store data indicative of authentication permitting the payment card for use in the second geographic region associated with the second ATM.

20. The system of claim 18, wherein the one or more standards includes the ISO8583 standard.

* * * * *